（12） United States Patent
Livne et al.

(10) Patent No.: US 12,388,760 B2
(45) Date of Patent: Aug. 12, 2025

(54) PACKET TRANSMISSION SCHEDULING FAIRNESS

(71) Applicant: Intel Corporation, Santa Clara, CA (US)

(72) Inventors: Sarig Livne, Schanya (IL); Noam Elati, Zichron Yaakov (IL); Hemanth Krishnan, Chandler, AZ (US); Venkidesh Krishna Iyer, Chandler, AZ (US); Adam Conyers, Phoenix, AZ (US); Michael G. Lefevre, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 687 days.

(21) Appl. No.: 17/475,197

(22) Filed: Sep. 14, 2021

(65) Prior Publication Data
US 2022/0006750 A1 Jan. 6, 2022

(51) Int. Cl.
H04L 47/2441 (2022.01)
H04L 43/106 (2022.01)
(Continued)

(52) U.S. Cl.
CPC ........ H04L 47/2441 (2013.01); H04L 43/106 (2013.01); H04L 47/193 (2013.01); H04L 47/2416 (2013.01)

(58) Field of Classification Search
CPC . H04L 47/2441; H04L 43/106; H04L 47/193; H04L 47/2416; H04L 41/0806;
(Continued)

(56) References Cited

U.S. PATENT DOCUMENTS 6,501,733 B1 * 12/2002 Falco ................... H04L 47/824
370/429
7,342,886 B1 * 3/2008 Srinivasan .............. H04L 47/10
370/230.1
(Continued)

OTHER PUBLICATIONS

Lama, Victor, Fabric Specialist G500, "An Introduction to Priority-based Flow Control", White Paper, Feb. 28, 2011, 4 pages.
(Continued)

Primary Examiner — Chandrahas B Patel
Assistant Examiner — David M Kayal
(74) Attorney, Agent, or Firm — Compass IP Law PC

(57) ABSTRACT

Examples described herein relate to a network interface device comprising a packet transmission scheduler. In some examples, the packet transmission scheduler is to: perform packet transmit arbitration among nodes, wherein based on a first node of the nodes having transmission paused by flow control, the perform packet transmit arbitration among nodes comprises retain relative priority of a packet departure time for the first node with respect to a second packet departure time associated with a second node of the nodes during a duration of flow control. In some examples, retaining relative priority of a packet departure time for the first node with respect to a second packet departure time associated with a second node of the nodes during a duration of flow control comprises adjust the packet departure time and the second packet departure time to stay within a time window but not rollover.

18 Claims, 13 Drawing Sheets

(51) Int. Cl.
*H04L 47/193* (2022.01)
*H04L 47/2416* (2022.01)

(58) Field of Classification Search
CPC ............. H04L 41/0895; H04L 47/6275; H04L 47/6215; H04L 47/10; H04L 47/00; H04L 47/266; H04L 47/562; H04L 47/62; H04L 47/624; H04L 47/6285; H04L 47/629; H04L 47/6295; H04L 47/12
See application file for complete search history.

(56) References Cited

U.S. PATENT DOCUMENTS 7,346,000 B1* 3/2008 Srinivasan .............. H04L 47/32
370/235
2007/0153803 A1* 7/2007 Lakshmanamurthy ...................... H04L 47/50
370/395.43
2019/0364459 A1* 11/2019 Lee ........................ H04W 28/10

OTHER PUBLICATIONS

Oracle, "Managing Network Datalinks in Oracle® Solaris 11.2", https://docs.oracle.com/cd/E36784_01/html/E37516/gmfdb.html, Sep. 2014, 124 pages.

Cisco, "Priority Flow Control: Build Reliable Layer 2 Infrastructure", © 2009 Cisco Systems, Inc., Oct. 20, 2008, 8 pages.

Peter L Dordal, "Queuing and Scheduling", An Introduction to Computer Networks, unicode-safer edition 2.0.11, © Copyright 2012-2022, https://intronetworks.cs.luc.edu/current/uhtml/fairqueuing.html, Aug. 2020, 28 pages.

* cited by examiner

ARBITRATE ACROSS PORTS TO SELECT A PACKET TO EGRESS
914

STORE DT VALUE FOR PORT FOR SUBSEQUENT USAGE

PACKET TRANSMISSION SCHEDULING FAIRNESS

BACKGROUND

Data centers provide vast processing, storage, and networking resources. For example, smart phones or internet of things (IoT) devices can leverage data centers to perform data analysis, data storage, or data retrieval. Data centers can communicate within and with outside devices using high speed networking devices such as network interfaces, switches, or routers. With the increase in packet traffic, there is contention for a packet that is permitted to be transmitted. Packet arbitration can be utilized to select a packet for transmission from varying sources of packets.

FIG. 1 depicts an example of multiple level arbitration for packet transmission. A winning traffic class (TC) selection per port can be propagated to port layer arbitration to arbitrate across ports to select the next fair port to be selected to allow packet transmission. Congestion can occur whereby a receive port or queue used by a data center receives more traffic than it can transfer for processing and the port or queue overflows. Flow control or congestion control attempts to reduce packet drops, reduce latency, and reduce buffering of packets in the network interface controller (NIC). Congestion control can reduce network congestion by pausing packets or reducing a transmit rate of packets sent from a transmitter to the congested port or queue. Congestion control can utilize technologies such as IEEE 802.1Qbb (2011) Priority-based Flow Control (PFC), Link Pause, and so forth.

Flow control can apply to Layer 2 nodes (e.g., Traffic Class (TC)) of a leaf-to-root hierarchical scheduler, such as that shown in FIG. 1. Flow control can be applied to individual nodes, group of nodes associated with a single port, or groups of nodes associated with multiple ports. Flow control applied to TC nodes can stall scheduling services for the flow-controlled nodes while other TC nodes are served based on a scheduling algorithm such as Weighted Fair Queuing (WFQ). After de-assertion of flow or congestion control, scheduling priority associated with paused packets may be lost and bandwidth allocated to nodes released from flow control may at least temporarily be under-allocated. Accordingly, after flow control is de-asserted, providing fair bandwidth allocation across multiple nodes, some of which are subject to flow control and some of which may not be subject to flow control, can be a challenge.

BRIEF DESCRIPTION OF THE DRAWINGS

FIGS. 9A and 9B depict an example process.

DETAILED DESCRIPTION

Figure 1:
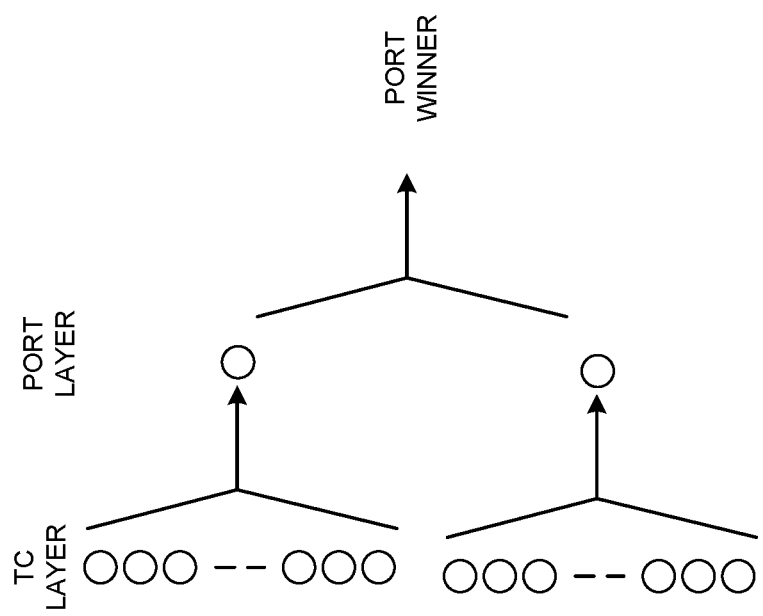
FIG. 1 depicts an example of multiple level arbitration for packet transmission.

After flow control is de-asserted (e.g., Xoff), one or more of the following may occur: traffic to a link partner can be bursty, packet scheduling for nodes can be delayed which may cause underrun at the destination that generated flow control, and/or potential starvation issues at a destination receive buffer due to a subset of sibling nodes being affected by the same congestion.

In some scenarios, transmit scheduling fairness and accuracy do not consider packet transmit priority characteristics present before flow control was asserted. When a node or a group of nodes are flow controlled, flow controlled nodes are taken out of arbitration to select the next fair winner traffic class for packet transmission. During flow control assertion, assuring fair bandwidth allocation based on WFQ can depend on one or more of: maintaining the correct Departure Time (DT) for one or more of the nodes, an amount of bytes dequeued from that node, last departure time (LDT) of the node's group, amount of bytes enqueued to that node, and the bandwidth allocation for that node. When flow control is asserted, DT of the flow-controlled node is stalled since there can be no additional dequeues from that node until it is released from flow control but packets from non-flow controlled nodes in the group continue to dequeue. Accordingly, LDT of the group of nodes keeps moving forward, but the DT of the flow-controlled node does not change. In some examples, a duration of time in which flow control is applied is indefinite and could last indefinitely. Flow control with an indefinite ending time could be considered unconstrained. Eventually, the DT drifts away from the increasing LDT and the drift can become large enough to lead to malfunction of WFQ such as if the transmit window is finite and wrap-around of DT and LDT values occurs. Following de-assertion of flow control, assuring fair bandwidth allocation based on WFQ can lead to all TCs for which flow control has been released to be re-sorted to pick the next best TC for transmission across one or all ports. Flow control assertion on TCs of one port can allow a non-flow controlled port to continuously dequeue and transmit packets and cause a similar DT to LDT drift at the port layer, that can break WFQ between ports.

Note that reference to a node can refer to one or more of: a queue, a scheduling node, a scheduling entity, port, traffic class (TC), Virtual Server Infrastructure (VSI), virtual function (VF), virtual machine (VM), Virtual Ethernet Bridge (VEB), NetDev, and so forth.

Some examples attempt to provide fairness in bandwidth allocation for packet transmission across nodes and ports after de-assertion of flow control to a traffic class node by utilizing one or more of: adjusting DT values of flow controlled nodes to stay within a moving window of DT values, adjusting DT values to maintain relative ordering of DT values associated with multiple flow controlled nodes, ordering DT values and modified DT values within a packet scheduling window, and maintaining a winning DT value of an arbitration winner at a port whose node(s) are flow controlled to maintain relative ordering of the winning DT value relative to DT values of other ports. A node can be associated with a Class of Service (CoS), Traffic Class (TC), quality of service (QoS), and/or service level agreement (SLA). A node can be associated with one or more virtual machine, one or more microservice, one or more container, one or more queues, one or more network interface devices. One or more nodes or entities can be associated with a particular TC. Although examples are described with respect to WFQ, other types of packet transmit arbitration schemes can be used such as Deficit Weighted Round Robin (DWRR), and so forth.

In case of PFC flow (non-regulation) control, the relative bandwidth allocation can be preserved across all priority flow controlled TCs of a port, during PFC to provide WFQ bandwidth allocation when the nodes are out of flow control. In case of regulation buffer flow control, bandwidth fairness can be maintained when a subset of TCs within or across ports are subject to flow control as well as when they are released from flow control. In case of TC layer flow control affecting TCs of different ports, WFQ bandwidth allocation fairness can be achieved across the ports at port layer.

Technologies described herein can be used for enterprise, datacenter as well as communications workload applications, networking, Network Function Virtualization (NFV), telco, or wireless applications.

Figure 2:
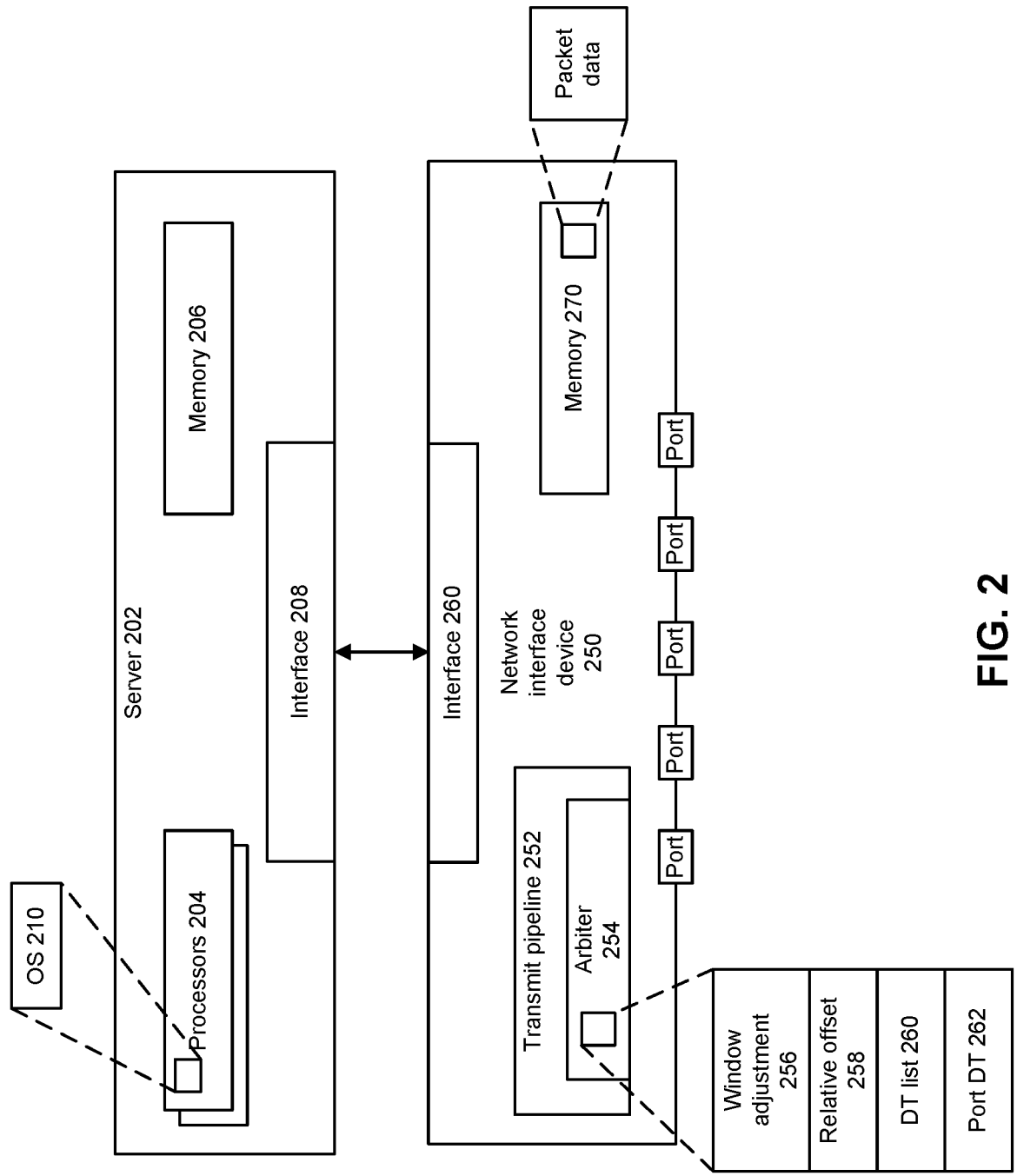
FIG. 2 depicts an example system.

FIG. 2 depicts an example system. Server 202 can include or access one or more processors 204, memory 206, and device interface 208, among other components described herein (e.g., accelerator devices, interconnects, and other circuitry). Processors 204 can execute one or more microservices, a virtual machine (VM), a container, or other distributed or virtualized execution environment that transmit packets or receive packets using network interface device 250. In some examples, one or more processors 204 can request network interface device 250 to transmit one or more packets using packet transmission fairness schemes described herein.

In some examples, operating system (OS) 120 or a driver, not shown, can enable or disable network interface device 250 from adjusting, sorting, and/or retaining departure times (DTs) of packets when or after flow control is applied, as described herein. In some examples, an option can be provided for software executing on processors 204 to select use of adjusting, sorting, and/or retaining departure times (DTs) of packets when or after flow control is applied, as described herein.

A packet may be used herein to refer to various formatted collections of bits that may be sent across a network, such as Ethernet frames, IP packets, TCP segments, UDP datagrams, etc. Also, as used in this document, references to L2, L3, L4, and L7 layers (layer 2, layer 3, layer 4, and layer 7) are references respectively to the second data link layer, the third network layer, the fourth transport layer, and the seventh application layer of the OSI (Open System Interconnection) layer model.

Network interface device 250 can be implemented as one or more of: a network interface controller (NIC), a remote direct memory access (RDMA)-enabled NIC, SmartNIC, router, switch, forwarding element, infrastructure processing unit (IPU), or data processing unit (DPU). Network interface device 250 can be communicatively coupled to interface 208 of server 202 using interface 260. Interface 208 and interface 260 can communicate based on Peripheral Component Interconnect Express (PCIe), Compute Express Link (CXL). See, for example, Peripheral Component Interconnect Express (PCIe) Base Specification 1.0 (2002), as well as earlier versions, later versions, and variations thereof. See, for example, Compute Express Link (CXL) Specification revision 2.0, version 0.7 (2019), as well as earlier versions, later versions, and variations thereof.

A transmit pipeline 252 can schedule packet transmission through one or more ports. Various examples can apply to one or more levels of a scheduling hierarchy including Traffic Class layer or other layer. Transmit pipeline 252 can utilize arbiter 254 to perform arbitration to select a packet for transmission among multiple nodes and multiple ports based on a lowest DT value. A DT value for a packet can be based on arbitration weight, quanta length of packet (packet size), and/or last departure time (LDT) of a group of nodes. In connection with fairness scheduling in a node layer (e.g., Traffic Class) of a leaf-to-root hierarchical scheduler performed by arbiter 254, after flow control ends for a node and transmission from the node can resume, arbiter 254 can provide for adjustment of DT values for packets associated with the node, by adjusting the DT value to stay within a window of managed DT values (so called window protection) and/or adjusting the DT value to maintain a relative distance from other DT values associated with flow controlled nodes. During a packet scheduling window, arbiter 254 can re-sort DT values and adjusted DT values from low-to-high for a node to determine a winning DT value from non-flow controlled node(s) (so called fast scrub). A packet scheduling window can include an amount of time to decide which packet to transmit next. For a port that is supplied with packets solely by flow controlled nodes, arbiter 254 can store a DT of a winning packet from arbitration from flow controlled nodes for the port and the port DT value relative to DT values of other flow controlled and non-flow controlled ports.

For example, using window adjustment 256, arbiter 254 can maintain information for the adjusted DT value to stay within a window of managed DT values. For example, using relative offset 258, arbiter 254 can maintain information for relative distances between DT values. For example, using DT list 260, arbiter 254 can maintain information for ordering of sorted DT values. For example, using port DT 262, arbiter 254 can maintain information for a DT value of a winning packet for a port that is not permitted to egress due to flow control. One or more of window adjustment 256, relative offset 258, DT list 260, and port DT 262 can be stored in memory 270. In addition, packet data (e.g., payload and/or header) can be stored in memory 270. Memory 270 can be implemented as a volatile memory device including a cache (e.g., Level 1 (L1), Level 2 (L2), Level 3 (L3), and/or last level cache (LLC)). Note that while memory 270 is shown as part of network interface device 250, memory 270 can be part of server 202 or another device.

Figure 3:
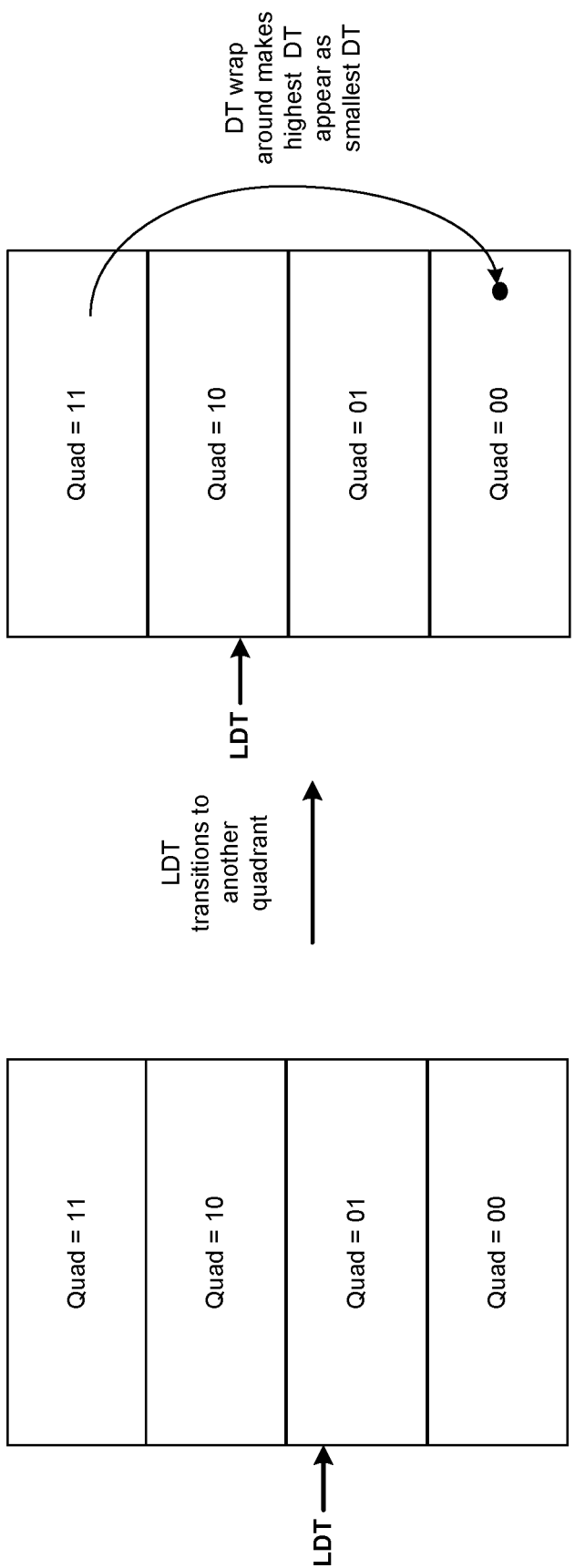
FIG. 3 depicts an example of departure time (DT) value wrap around.

FIG. 3 depicts an example of DT value wrap around. In the presence of flow control, a node can be flow controlled for an arbitrary amount of time, thus causing its Departure Time (DT) to be farther behind than its sibling nodes causing either its DT to go out of the window or its sibling node's DTs to go over the DT window. If a node is flow controlled, its DT stays the same but sibling entities continue to transmit and their DTs increase and group DT increases. If a DT value for a paused node has not changed relative to DT values of unpaused nodes and a finite DT window is utilized, then the DT values of unpaused nodes may wrap around. In such case, a lowest to highest ordering of the DT value for the paused node and the wrapped around DT values of unpaused nodes may not reflect that the DT value of paused node as the wrapped around DT values of unpaused nodes may be lower than the DT value for the paused node. Consequently, on flow control de-assertion with respect to the paused node, bandwidth allocation to the paused node may not be fair as its DT value is incorrectly ordered with respect to wrapped around DT values of unpaused nodes. Some examples utilize window protection or wrap around protection to adjust the DT value for the paused node to attempt to provide that no DT in a group of nodes that are arbitrating together can go out of a valid DT window. Consequently, fair bandwidth allocation across all congestion domains (CGDs) of a port may occur by maintaining the DT value of TCs (CGD) of a port within a valid DT range (e.g., valid DT window).

In this example of FIG. 3, migration of LDT from a DT value range of Quad 01 to a DT value range of Quad 10 can cause a change in DT value window range. DT value in Quad 11 can be moved to a bottom of the valid window (Quad 00) and appear to be lower than LDT but is higher than LDT. In addition, the DT value that is modified wraps around to Quad 00 may appear to be lower than DT values properly in the Quad 00, which leads to unfair bandwidth allocation.

Some examples determine if a DT value is in a valid window and, if the DT value is not within the valid window, to modify or transpose the DT value to be within the valid window. The transpose can be performed on DT values in a sibling node group (CGD) to adjust DT values to the top or bottom of a window (DT protection) on a node (paused or unpaused) whose DT goes out of the valid window. The DT values can be compared against the last departure time (LDT) of the sibling group (node group) and LDT is increased on successful dequeue of a packet from a node from the sibling group. When there is one or more successful dequeues of packets from one or more nodes, the LDT of the group is updated.

In connection with DT value adjustment based on maintaining DT values within a valid window, if DT values of multiple nodes are different but are reset to a same DT value, arbitration fairness may be lost among the multiple nodes. Some examples attempt to maintain fairness across nodes that are flow controlled by maintaining the relative DT value distance between DT values of flow controlled nodes while also keeping the DTs within valid range of LDT. Some examples attempt to retain relative distance among DT values despite a changing a range of a valid DT window.

In some examples, a relative DT value ordering, from lowest to highest, among DT values and the LDT, can be maintained among quadrants of DT values of a DT window when the LDT value increases. In some examples, based on transition of the LDT to another quadrant of the valid window of DT values, a determination can be made if a DT value is outside of a valid window range of DT values. If the DT value is moving out of the valid window range into an invalid quadrant from the bottom of the valid window, then that DT value can be adjusted to be in the bottom of the valid window. If the DT value is moving out of the valid window range into the invalid quadrant from the top of the valid window, then that DT can be placed at a top of the valid window.

Figure 4A:
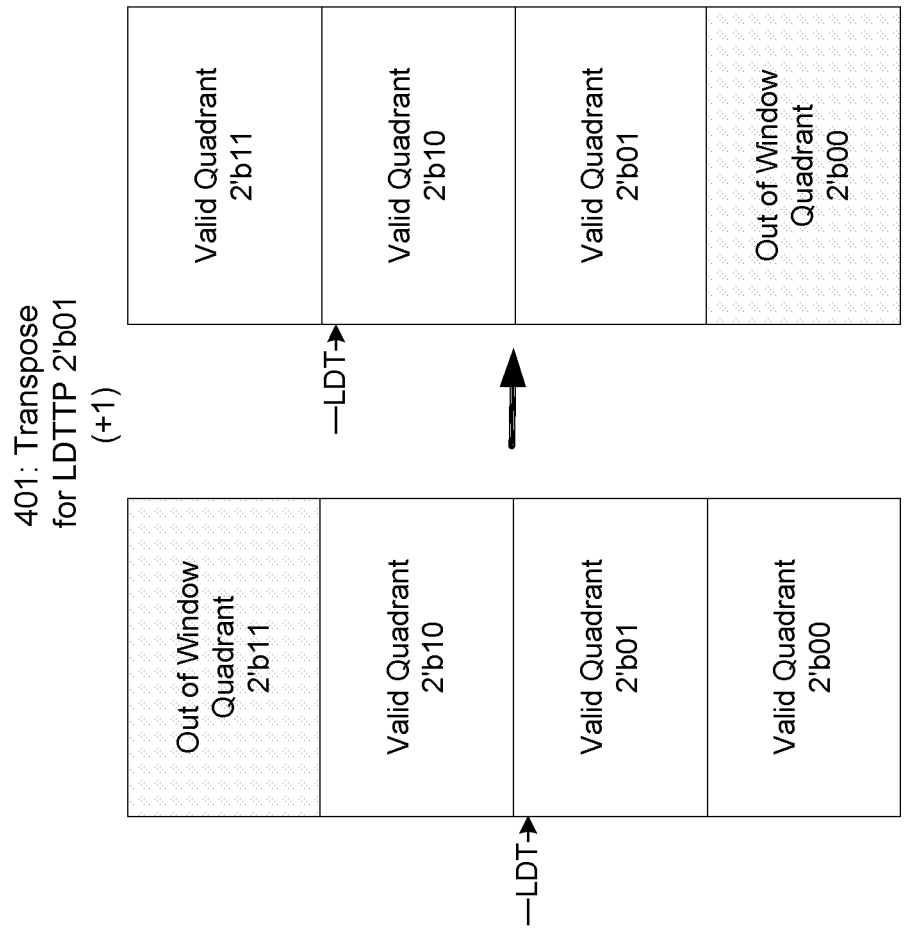
FIGS. 4A and 4B depict an example of window adjustments.
Figure 4B:
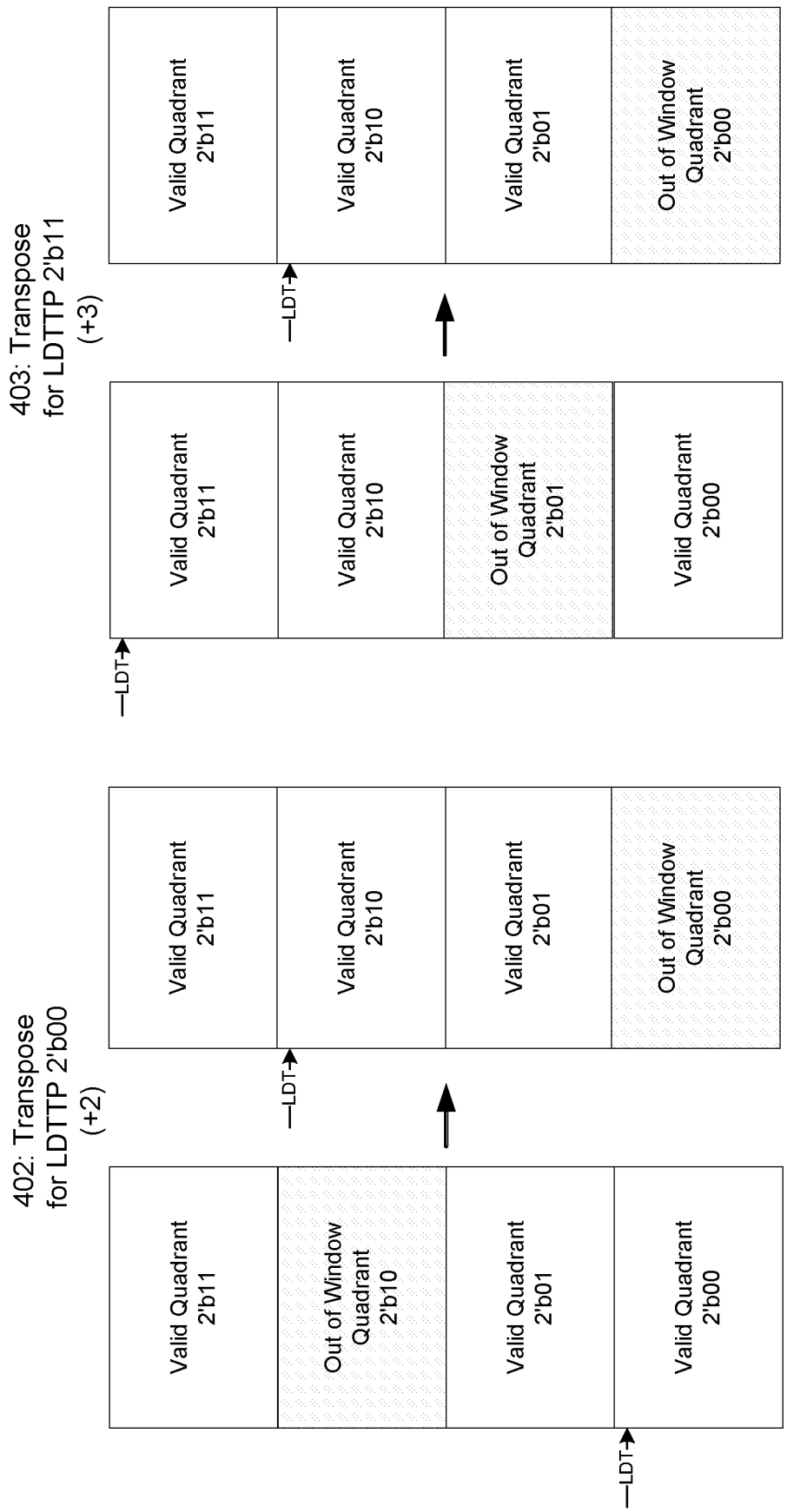

FIGS. 4A and 4B depict an example of window adjustments. In this example, a DT window is segmented into 4 quadrants, although other numbers of quadrants can be used. A quadrant represents a range of DT values and successive quadrants can represent different successive ranges of DT values. In some examples, for a valid window with 4 quadrants, the LDT can be assigned to be within a second to top quadrant. For example, for quadrants 00 to 11, LDT can be assigned and re-assigned to quadrant 10. However, quadrant numbers are illustrative and need not start at 00 but can start at any value.

A valid window can be divided into n quadrants. In this example, n=4 and there are 4 DT quadrants (Quads), however n can be another integer value. DT values across siblings of a group of arbitrating nodes can be placed into n DT quadrants. If a current last departure time (LDT) value is in Quadrant(x), then a valid quadrant range (in 2s complement representation) can be: Quad(x±[(n/2)−1]). An invalid quadrant can be outside of the valid quadrant range.

In an example with 4 quadrants, 2 bits can be used to represent a quadrant associated with a DT value (LDT (T)rans(P)ose bits (LDTTP)). The 2 bit quadrant identifier can be changed to identify a new associated quadrant for the DT value. Other numbers of bits can be used for a quadrant identifier.

At 401 in FIG. 4A, for an invalid window range being quadrant (11), adding +1 to LDTTP bits causes adjustment of the LDT to be associated with quadrant 10 and adjustment of quadrant so that invalid quadrant is the lowest quadrant 00. At 402 in FIG. 4B, for an invalid window range (being out of window quadrant (10)), adding +2 to LDTTP bits causes adjustment of the LDT to be associated with quadrant 10 and adjustment of quadrants so that invalid quadrant is lowest quadrant 00. At 403 in FIG. 4B, for an invalid window range (being out of window quadrant (01)), adding +3 to LDTTP bits causes adjustment of the LDT to be associated with quadrant 10 and adjustment of quadrants so that invalid quadrant lowest quadrant 00. This transpose mechanism and DT adjustment, causes DTs in valid quadrants to be in correct high to low DT order for fair DT arbitration.

When a packet associated with a TC for a port is dequeued, some examples update an LDT to a DT value of the most recently dequeued node, if the new DT is higher than the group's LDT. After a winner port/TC is dequeued, DT of the winner TC of the winner port can be moved based on an amount of bytes dequeued and its bandwidth allocation. As the LDT of a group of nodes is incremented, LDT_DELTA can be added to DT values of TCs of a port that are in flow control. An LDT_DELTA value can be determined so that a last departure time (LDT) can be maintained for a group of sibling nodes (e.g., TC nodes for a single port). In some examples, LDT_DELTA can be determined as [current updated LDT value−previous LDT value].

DT values of nodes that are subject to Flow Control due to REGULATION and/or PFC can be incremented by LDT_DELTA so that DT values stay within the valid scheduling window and relative DT distance (and hence relative bandwidth allocation) between sibling nodes that were part of PFC group can be maintained.

A REGULATION ONLY flow control type that arises from congestion within a network interface device and not from a link partner. In some examples, DT of sibling nodes that are in flow control with REGULATION ONLY flow control type may not be incremented by LDT_DELTA as the node that dequeued can have dequeued bytes added. Not adding LDT_DELTA can be more fair because regulation only buffer flow control is generally very transient and small compared to PFC and a node can retain its DT and hence its original bandwidth without LDT delta addition. Other sibling nodes that are flow-controlled due to REGULATION ONLY may not have their DT values adjusted as REGULATION ONLY flow control can refer to transient transmit buffer congestion. Maintaining an original DT (subject to window protection) can provide for accurate bandwidth allocation to the node.

Figure 5:
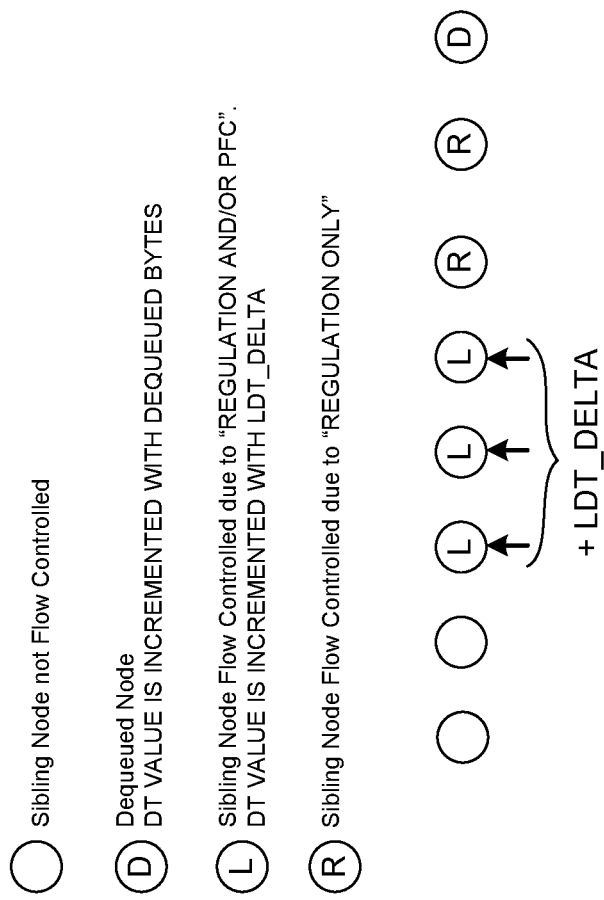
FIG. 5 depicts an example of updates to DT values based on changes to LDT.

FIG. 5 depicts an example of updates to DT values based on changes to LDT. In this example, LDT_DELTA can be applied to DT values of nodes that are subject to Flow Control due to REGULATION and/or PFC. For example, packets with DT values of 200, 500, and 1000. When LDT moves, an LDT_DELTA can be determined and added to DT values of flow controlled nodes. For example, if LDT_DELTA is 500, then change DT values change to 700, 1000, 1500 and remain within a valid window.

Figure 6:
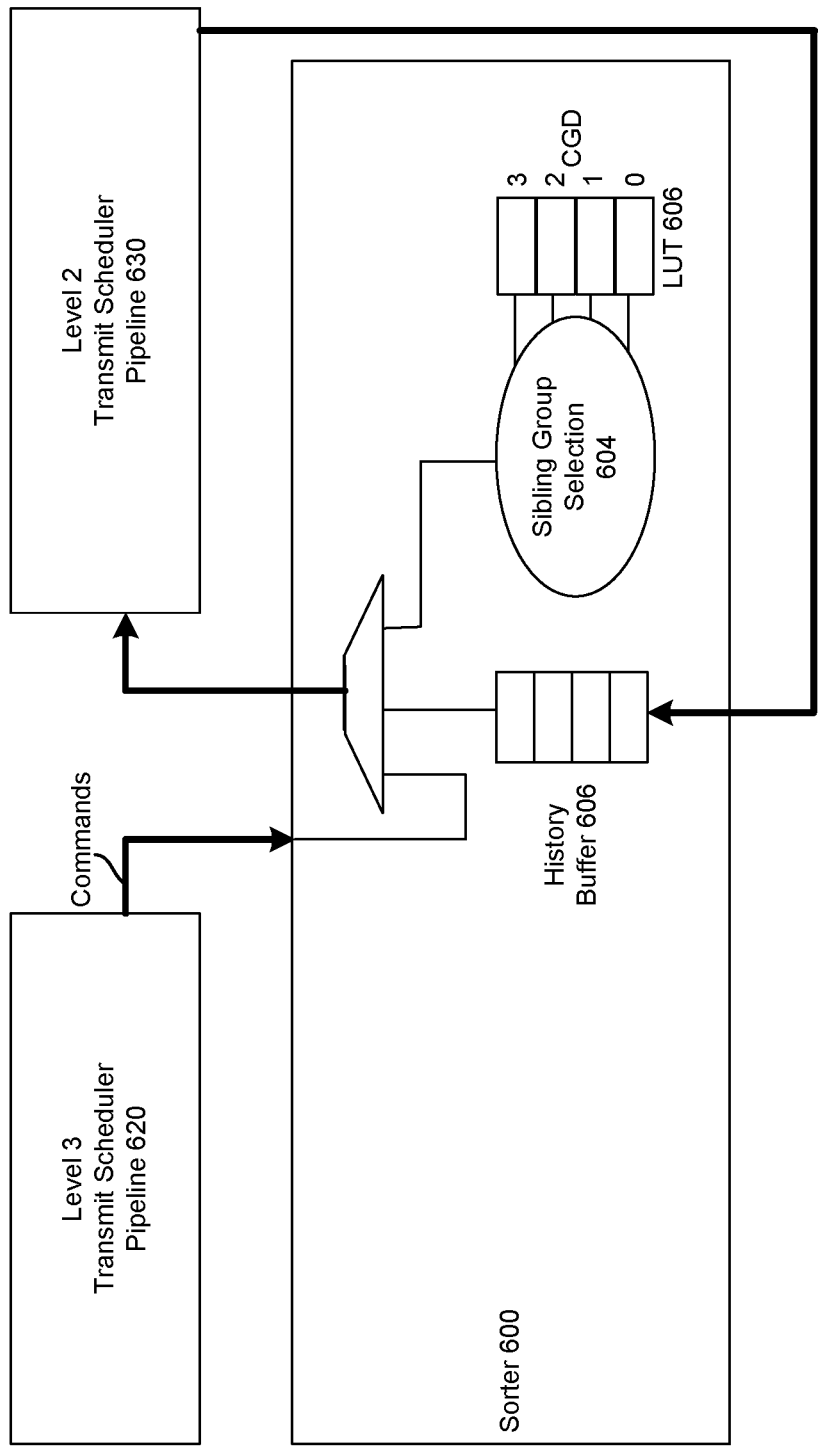
FIG. 6 depicts an example sorting operation.

FIG. 6 depicts an example sorting operation. Level 3 transmit scheduler pipeline 620 can refer to one or more of a host, virtual machine (VM), container, application, microservice, virtual server instance (VSI), and so forth. Level 3 transmit scheduler pipeline 620 can provide soring operation instructions to sorter 600. During packet scheduling or dequeue window in which a packet is selected for a port from among nodes, sorter 600 can re-sort DTs sorted based on updated DT and relative TC priority. After sorting, a lowest DT can be selected and its associated packet can be selected to be sent from the port. Indication that DTs of nodes for a port have been updated and re-sorted using latest flow control status can be tracked using lookup table (LUT) 606. In this example, indication that CGDs or ports 0 to 3 have completed DT updates and were re-sorted with latest flow control information can be stored in LUT 606.

DTs for nodes associated with at least one port can re-sorted based on updated DT and relative TC priority. Sorter 600 can sort DTs for a node for which FC is not asserted. On or after de-assertion of FC, when flow control for a node is removed, quanta accumulated at that node can again become eligible to dequeue using TC sort arbitration. In cases of buffer flow control, a single downstream buffer can flow control traffic across multiple CGDs and when or after the downstream buffer is no longer congested, CGDs with bulk traffic can become eligible for sorting. Level 2 transmit scheduler 630 can sort DTs of nodes with their respective siblings (e.g., TCs of a single port) to provide fairness at the TC level prior to winner propagation to the port layer for port layer arbitration (e.g., Level 1 arbitration (not shown)). Sorter 600 can monitor scheduler operations and sorting commands from level 3 transmit scheduler 620 sent to level 2 transmit scheduler 630 to determine whether DTs of level 2 sibling groups have been re-sorted within the scheduler transmission window.

LUT 606 can store a list of CGDs identifying if they have been re-sorted with updated flow control status for sibling nodes. Sorter 600 can perform sorting of DT values of a CGD associated with port 0, then sort DTs of a CGD associated with port 1, and so forth. Sorter 600 can update an entry for a CGD in LUT 606 to indicate whether a CGD (groups of sibling nodes) has been updated or not been updated after a re-sort so that, in some cases, a sorting command does not attempt to sort DTs that have been sorted.

History buffer 606 can store prior re-sorted CGDs, for potential reuse instead of sorting DT values again for that CGD. History buffer 606 can store a last integer number of CGDs/ports for which re-sort is performed using the most updated flow control status.

Figure 7:
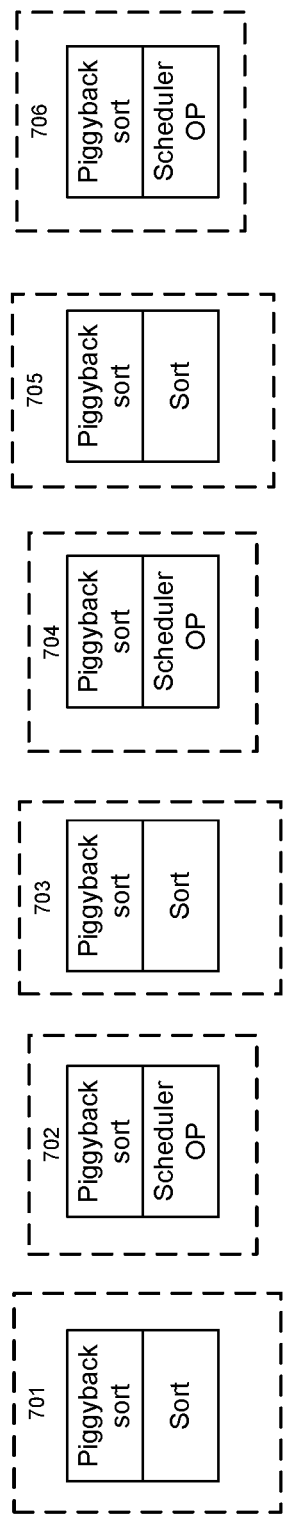
FIG. 7 depicts an example of sorting operation submissions.

FIG. 7 depicts an example of sorting operation submissions. In some examples, a Level 3 source can issue sort operations and piggyback sort operations between transmit scheduler operations (OPs). In some examples, a Level 3 source can issue a sort operation with a scheduler operation. One or more DT sort operations for DT values of a CGD can be injected between scheduler operations. Sort operations can be issued with scheduler operations so that sort operations are performed for a same scheduling group as that associated with the scheduler operation or another sibling group. Re-sorts can be performed in parallel with other scheduling operations such a packet enqueues, dequeues, packet expansion updates and providing rate limiting or service level agreement (SLA) services at the TC layer.

A scheduler operation can include an enqueue command to cause a scheduling of a packet for transmission. Piggyback sort can apply a re-sort to a group that has not been identified as sorted in the LUT 606 in some cases. However, sorting operations can be applied to a group that has been identified as sorted in LUT 606.

In this example, piggyback sort and sorts can be issued at 701, 703, and 705 interleaved between scheduler operations 702, 704, and 706. Other examples can utilize fewer piggyback sort and sorts or more piggyback sort and sorts between scheduler operations.

Figure 8:
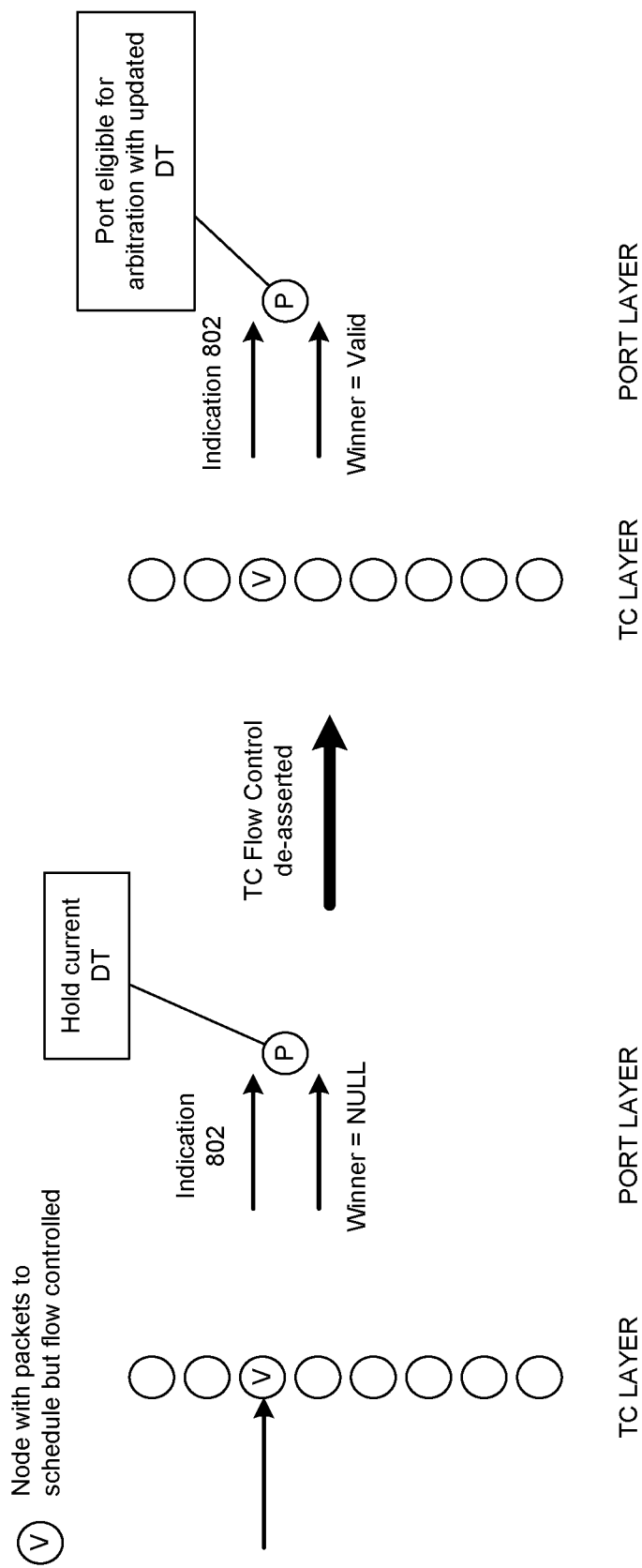
FIG. 8 depicts an example of maintaining a DT value for a port that is subject to flow control and unable to transmit a packet.

FIG. 8 depicts an example of maintaining a DT value for a port that is subject to flow control and unable to transmit a packet. The port that is subject to flow control does not participate in port arbitration. A hierarchical scheduler arbitrates among ports to determine what port is allowed to transmit a packet. If all TCs that provide packets to a port are flow controlled, then a winner packet is not available from the port. If there can be no winner propagated from TC layer to the port layer, due to TC flow control for the port, then some examples provide a winner DT value and the winner DT value can be identified. But at least one other port that is not subject to FC, may be permitted transmit packets and DT values for the at least one other port that is not subject to FC can be updated. The winner DT value can be held within a valid DT-LDT window range and the winner DT value can be prevented from being raised to LDT so that after removal of flow control, the port can receive bandwidth and transmission priority based on the winner DT value.

Indication 802 can indicate a node has at least one packet to transmit but it not able to transmit the at least one packet due to flow control (so called empty winner) and to store a DT value of an arbitration winning packet. When indication 802 is set to yes (e.g., port is not able to transmit a packet due to flow control), DT value of the port to which the sibling groups belong-to can be maintained until a valid non-empty winner is propagated. The DT value can be updated using window protection as described herein. When indication 802 is set to no (e.g., port is able to transmit a packet), the port can provide its updated DT value for port level arbitration and carry forward its bandwidth allocation and transmission priority that was not provided because of flow control.

Figure 9A:
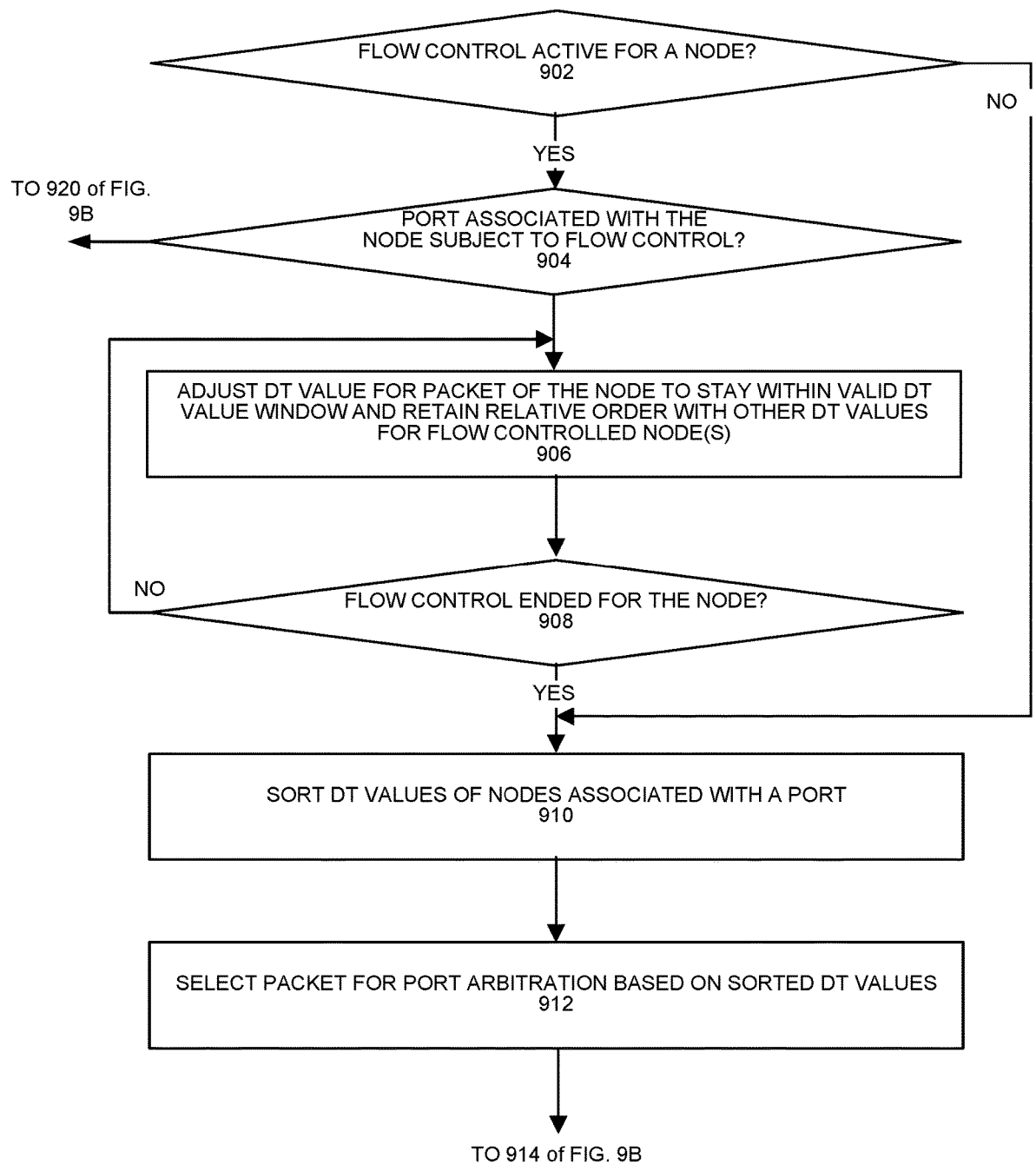

FIGS. 9A and 9B depict an example process. At 902, a determination can be made if flow control is active for a subject node. If flow control is active for the subject node, then the process can continue to 904. If flow control is not active for the subject node, then the process can continue to 910. At 904, a determination can be made if a subject port associated with the subject node has all of its feeder nodes subject to flow control. If all feeder nodes to the subject port are subject to flow control, the process can continue to 920. If all feeder nodes to the subject port are not subject to flow control, the process can continue to 906.

At 906, DT for a packet of the subject node can be adjusted to stay within an active DT window and maintain relative order of the DT with respect to other flow controlled nodes associated with the subject port. For example, window protection technologies described herein can be utilized to adjust the DT for a packet of the subject node. For example, adjustment of the DT for a packet of the subject node can utilize the LDT delta technologies described herein. The adjusted DT can be stored in a list of DTs for nodes associated with the subject port.

At 908, a determination can be made if flow control for the subject node has been lifted. If flow control for the subject node has been lifted, the process can continue to 910. If flow control for the subject node has not been lifted, the process can continue to 906.

At 910, the order of non-flow controlled DT values for nodes associated with the subject port can be sorted within a transmit scheduler window. For example, the order can be stored for reuse or adjustment.

At 912, a packet can be selected for port arbitration from the subject port based on the order of non-flow controlled DT values for nodes associated with the subject port. At 914, as part of hierarchical scheduling, arbitration can be performed across multiple ports to select a port that is permitted to transmit a packet. For example, a previously stored DT value, that is potentially adjusted, can be used in arbitration between the subject port and other ports.

At 920, a DT value for the subject port can be stored for subsequent usage. The DT value can be adjusted to stay within an active DT window. The process can return to 904.

Figure 10:
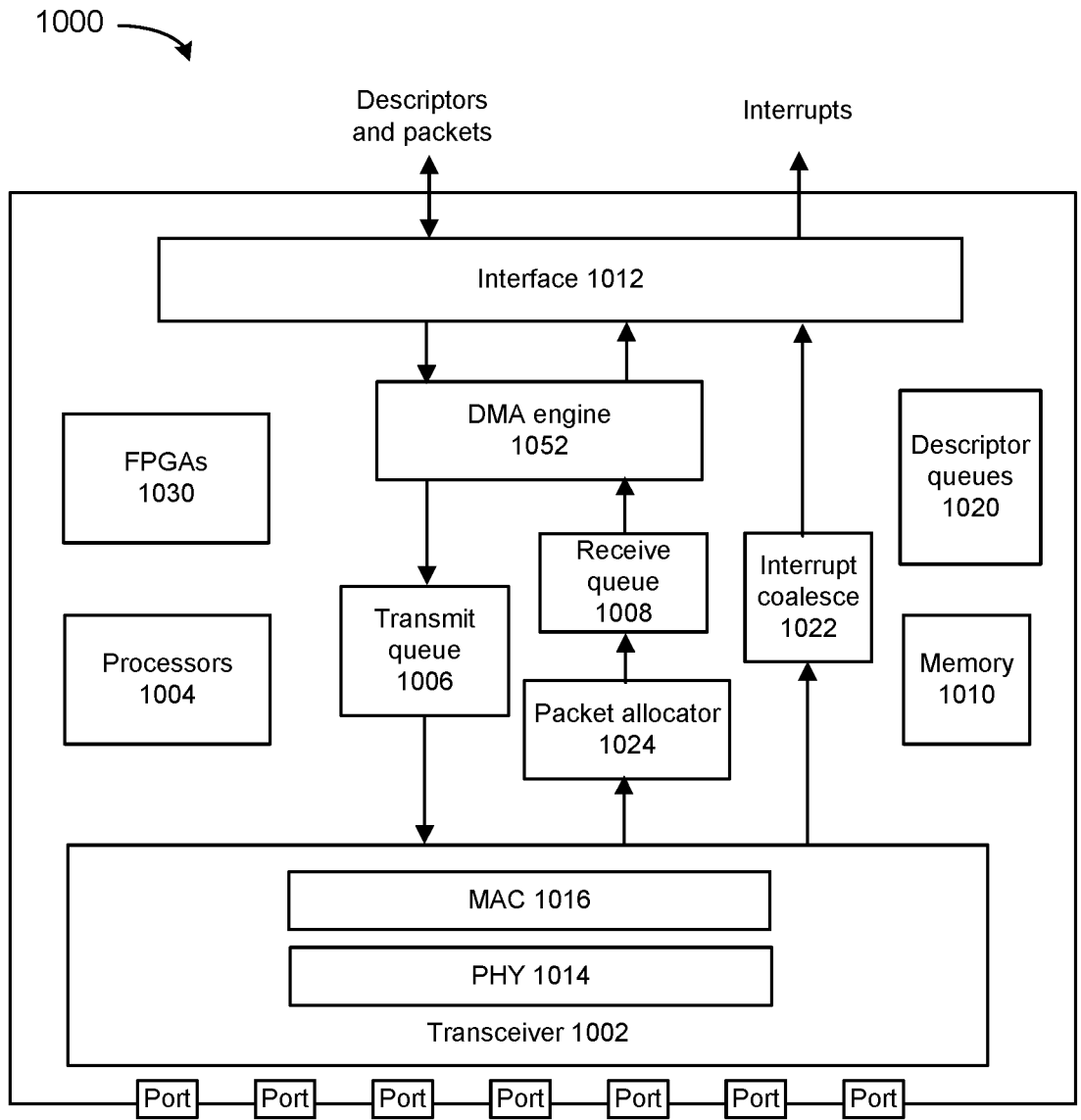
FIG. 10 depicts an example network interface device.

FIG. 10 depicts an example network interface. Various processor resources in the network interface can perform one or more of: modifying DT values of flow controlled nodes to be within a moving window of DT values but not rolling over values, modifying DT values to maintain relative ordering of DT values associated with multiple flow controlled nodes, ordering DT values and modified DT values within a packet scheduling window, and maintaining a winning DT value of an arbitration winner at a port whose node(s) are flow controlled to maintain relative ordering of the winning DT value relative to DT values of other ports, as described herein. In some examples, network interface 1000 can be implemented as a network interface controller, network interface card, a host fabric interface (HFI), or host bus adapter (HBA), and such examples can be interchangeable. Network interface 1000 can be coupled to one or more servers using a bus, PCIe, CXL, or DDR. Network interface 1000 may be embodied as part of a system-on-a-chip (SoC) that includes one or more processors, or included on a multichip package that also contains one or more processors.

Some examples of network device 1000 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices. Examples herein can apply to use cases outside of IPU or DPU. For example, a networking system on chip (SoC) can operate as a control plane processor, data plane processor, network security processor, a Gateway Device, a SD-WAN Device, or a Universal Customer Premises Equipment (uCPE) device can also include network device 1000 and use DT adjustment schemes described herein.

Network interface 1000 can include transceiver 1002, processors 1004, transmit queue 1006, receive queue 1008, memory 1010, and bus interface 1012, and DMA engine 1052. Transceiver 1002 can be capable of receiving and transmitting packets in conformance with the applicable protocols such as Ethernet as described in IEEE 802.3, although other protocols may be used. Transceiver 1002 can receive and transmit packets from and to a network via a network medium (not depicted). Transceiver 1002 can include PHY circuitry 1014 and media access control (MAC) circuitry 1016. PHY circuitry 1014 can include encoding and decoding circuitry (not shown) to encode and decode data packets according to applicable physical layer specifications or standards. MAC circuitry 1016 can be configured to perform MAC address filtering on received packets, process MAC headers of received packets by verifying data integrity, remove preambles and padding, and provide packet content for processing by higher layers. MAC circuitry 1016 can be configured to assemble data to be transmitted into packets, that include destination and source addresses along with network control information and error detection hash values.

Processors 1004 can be any a combination of a: processor, core, graphics processing unit (GPU), field programmable gate array (FPGA), application specific integrated circuit (ASIC), or other programmable hardware device that allow programming of network interface 1000. For example, a "smart network interface" or SmartNIC can provide packet processing capabilities in the network interface using processors 1004.

Processors 1004 can include a programmable processing pipeline that is programmable by P4, C, Python, Broadcom Network Programming Language (NPL), or x86 compatible executable binaries or other executable binaries. A programmable processing pipeline can include one or more match-action units (MAUs) that can be configured to perform one or more of: modifying DT values of flow controlled nodes to be within a moving window of DT values but not rolling over values, modifying DT values to maintain relative ordering of DT values associated with multiple flow controlled nodes, ordering DT values and modified DT values within a packet scheduling window, and maintaining a winning DT value of an arbitration winner at a port whose node(s) are flow controlled to maintain relative ordering of the winning DT value relative to DT values of other ports, as described herein. Processors, FPGAs, other specialized processors, controllers, devices, and/or circuits can be used utilized for packet processing or packet modification. Ternary content-addressable memory (TCAM) can be used for parallel match-action or look-up operations on packet header content.

Packet allocator 1024 can provide distribution of received packets for processing by multiple CPUs or cores using receive side scaling (RSS). When packet allocator 1024 uses RSS, packet allocator 1024 can calculate a hash or make another determination based on contents of a received packet to determine which CPU or core is to process a packet.

Interrupt coalesce 1022 can perform interrupt moderation whereby network interface interrupt coalesce 1022 waits for multiple packets to arrive, or for a time-out to expire, before generating an interrupt to host system to process received packet(s). Receive Segment Coalescing (RSC) can be performed by network interface 1000 whereby portions of incoming packets are combined into segments of a packet. Network interface 1000 provides this coalesced packet to an application.

Direct memory access (DMA) engine 1052 can copy a packet header, packet payload, and/or descriptor directly from host memory to the network interface or vice versa, instead of copying the packet to an intermediate buffer at the host and then using another copy operation from the intermediate buffer to the destination buffer.

Memory 1010 can be any type of volatile or non-volatile memory device and can store any queue or instructions used to program network interface 1000. Transmit queue 1006 can include data or references to data for transmission by network interface. Receive queue 1008 can include data or references to data that was received by network interface from a network. Descriptor queues 1020 can include descriptors that reference data or packets in transmit queue 1006 or receive queue 1008. Bus interface 1012 can provide an interface with host device (not depicted). For example, bus interface 1012 can be compatible with or based at least in part on PCI, PCI Express, PCI-x, Serial ATA, and/or USB (although other interconnection standards may be used), or proprietary variations thereof.

Figure 11:
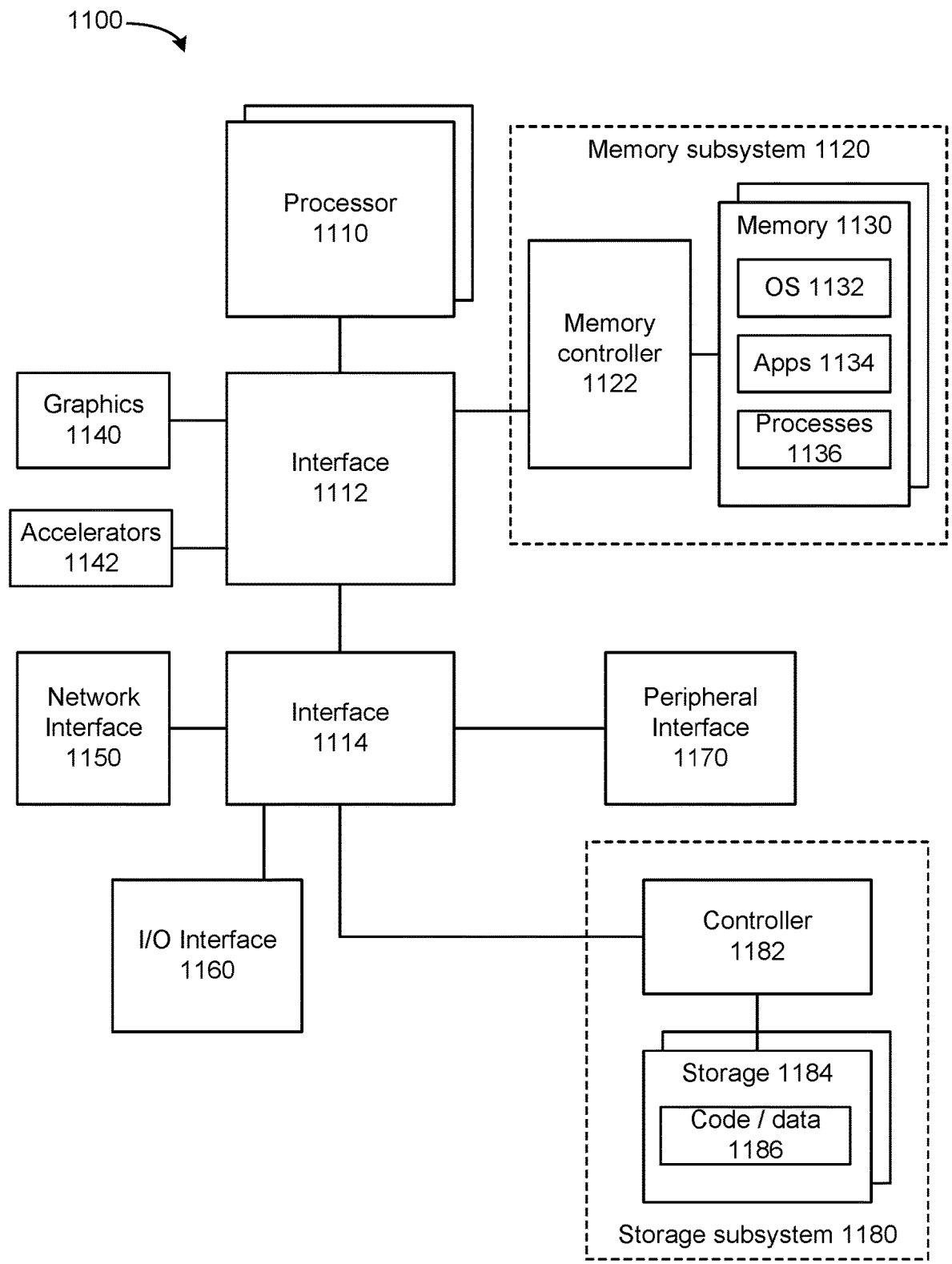
FIG. 11 depicts a system.

FIG. 11 depicts an example computing system. Components of system 1100 (e.g., processor 1110, network interface 1150, and so forth) to perform one or more of: modifying DT values of flow controlled nodes to be within a moving window of DT values but not rolling over values, modifying DT values to maintain relative ordering of DT values associated with multiple flow controlled nodes, ordering DT values and modified DT values within a packet scheduling window, and maintaining a winning DT value of an arbitration winner at a port whose node(s) are flow controlled to maintain relative ordering of the winning DT value relative to DT values of other ports, as described herein. System 1100 includes processor 1110, which provides processing, operation management, and execution of instructions for system 1100. Processor 1110 can include any type of microprocessor, central processing unit (CPU), graphics processing unit (GPU), processing core, or other processing hardware to provide processing for system 1100, or a combination of processors. Processor 1110 controls the overall operation of system 1100, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1100 includes interface 1112 coupled to processor 1110, which can represent a higher speed interface or a high throughput interface for system components that needs higher bandwidth connections, such as memory subsystem 1120 or graphics interface components 1140, or accelerators 1142. Interface 1112 represents an interface circuit, which can be a standalone component or integrated onto a processor die. Where present, graphics interface 1140 interfaces to graphics components for providing a visual display to a user of system 1100. In one example, graphics interface 1140 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1140 generates a display based on data stored in memory 1130 or based on operations executed by processor 1110 or both. In one example, graphics interface 1140 generates a display based on data stored in memory 1130 or based on operations executed by processor 1110 or both.

Accelerators 1142 can be a fixed function or programmable offload engine that can be accessed or used by a processor 1110. For example, an accelerator among accelerators 1142 can provide compression (DC) capability, cryptography services such as public key encryption (PKE), cipher, hash/authentication capabilities, decryption, or other capabilities or services. In some embodiments, in addition or alternatively, an accelerator among accelerators 1142 provides field select controller capabilities as described herein. In some cases, accelerators 1142 can be integrated into a CPU socket (e.g., a connector to a motherboard or circuit board that includes a CPU and provides an electrical interface with the CPU). For example, accelerators 1142 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1142 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1120 represents the main memory of system 1100 and provides storage for code to be executed by processor 1110, or data values to be used in executing a routine. Memory subsystem 1120 can include one or more memory devices 1130 such as read-only memory (ROM), flash memory, one or more varieties of random access memory (RAM) such as DRAM, or other memory devices, or a combination of such devices. Memory 1130 stores and hosts, among other things, operating system (OS) 1132 to provide a software platform for execution of instructions in system 1100. Additionally, applications 1134 can execute on the software platform of OS 1132 from memory 1130. Applications 1134 represent programs that have their own operational logic to perform execution of one or more functions. Processes 1136 represent agents or routines that provide auxiliary functions to OS 1132 or one or more applications 1134 or a combination. OS 1132, applications 1134, and processes 1136 provide software logic to provide functions for system 1100. In one example, memory subsystem 1120 includes memory controller 1122, which is a memory controller to generate and issue commands to memory 1130. It will be understood that memory controller 1122 could be a physical part of processor 1110 or a physical part of interface 1112. For example, memory controller 1122 can be an integrated memory controller, integrated onto a circuit with processor 1110.

In some examples, OS 1132 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. In some examples, a driver can configure network interface 1150 to allocate packets for transmission to fine or coarse grained lists, as described herein. In some examples, a driver can enable or disable offload to network interface 1150 to allocate packets for transmission to fine or coarse grained lists, as described herein. A driver can advertise capability of network interface 1150 to allocate packets for transmission to fine or coarse grained lists, as described herein.

While not specifically illustrated, it will be understood that system 1100 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1100 includes interface 1114, which can be coupled to interface 1112. In one example, interface 1114 represents an interface circuit, which can include standalone components and integrated circuitry. In one example, multiple user interface components or peripheral components, or both, couple to interface 1114. Network interface 1150 provides system 1100 the ability to communicate with remote devices (e.g., servers or other computing devices) over one or more networks. Network interface 1150 can include an Ethernet adapter, wireless interconnection components, cellular network interconnection components, USB (universal serial bus), or other wired or wireless standards-based or proprietary interfaces. Network interface 1150 can transmit data to a device that is in the same data center or rack or a remote device, which can include sending data stored in memory.

Some examples of network interface 1150 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 1100 includes one or more input/output (I/O) interface(s) 1160. I/O interface 1160 can include one or more interface components through which a user interacts with system 1100 (e.g., audio, alphanumeric, tactile/touch, or other interfacing). Peripheral interface 1170 can include any hardware interface not specifically mentioned above. Peripherals refer generally to devices that connect dependently to system 1100. A dependent connection is one where system 1100 provides the software platform or hardware platform or both on which operation executes, and with which a user interacts.

In one example, system 1100 includes storage subsystem 1180 to store data in a nonvolatile manner. In one example, in certain system implementations, at least certain components of storage 1180 can overlap with components of memory subsystem 1120. Storage subsystem 1180 includes storage device(s) 1184, which can be or include any conventional medium for storing large amounts of data in a nonvolatile manner, such as one or more magnetic, solid state, or optical based disks, or a combination. Storage 1184 holds code or instructions and data 1186 in a persistent state (e.g., the value is retained despite interruption of power to system 1100). Storage 1184 can be generically considered to be a "memory," although memory 1130 is typically the executing or operating memory to provide instructions to processor 1110. Whereas storage 1184 is nonvolatile, memory 1130 can include volatile memory (e.g., the value or state of the data is indeterminate if power is interrupted to system 1100). In one example, storage subsystem 1180 includes controller 1182 to interface with storage 1184. In one example controller 1182 is a physical part of interface 1114 or processor 1110 or can include circuits or logic in both processor 1110 and interface 1114.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 1100. More specifically, power source typically interfaces to one or multiple power supplies in system 1100 to provide power to the components of system 1100. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1100 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Various examples described herein can be used to adjust time stamps and arbitrate packet transmissions within a device interface (e.g., CXL or PCIe lanes) and choose which packet to transmit.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes one or more examples, and includes a method comprising: performing packet transmit arbitration among nodes, wherein based on a first node of the nodes having transmission paused by flow control, the performing packet transmit arbitration among nodes comprises retaining relative priority of a packet departure time for the first node with respect to a second packet departure time associated with a second node of the nodes during a duration of flow control.

Example 2 includes one or more examples, wherein flow control is applied to the first node of the nodes independent of whether flow control is applied to another node of the nodes.

Example 3 includes one or more examples, wherein the retaining relative priority of a packet departure time for the first node with respect to a second packet departure time associated with a second node of the nodes during a duration of flow control comprises adjusting the packet departure time and the second packet departure time to stay within a time window but not rollover.

Example 4 includes one or more examples, wherein the retaining relative priority of a packet departure time for the first node with respect to a second packet departure time associated with a second node of the nodes during a duration of flow control comprises retaining a relative time order between the packet departure time and the second packet departure time.

Example 5 includes one or more examples, and includes sorting packet departure times of the nodes from lowest to highest, the packet departure times of the nodes comprising the adjusted packet departure time and the adjusted second packet departure time.

Example 6 includes one or more examples, wherein the sorting packet departure times of the nodes from lowest to highest comprises sorting the packet departure times within a transmit scheduling window.

Example 7 includes one or more examples, and includes based on flow control applied at a port level, retaining the packet departure time and the second packet departure time for submission after flow control at the port level ends.

Example 8 includes one or more examples, wherein a network interface device is to perform the performing packet transmit arbitration among nodes and wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

Example 9 includes one or more examples, and includes at least one computer-readable medium comprising instructions stored thereon, that if executed by one or more processors, cause the one or more processors to: configure a network interface device to perform packet transmit arbitration among nodes, wherein based on a first node of the nodes having transmission paused by flow control, the performing packet transmit arbitration among nodes comprises retaining relative priority of a packet departure time for the first node with respect to a second packet departure time associated with a second node of the nodes during a duration of flow control.

Example 10 includes one or more examples, wherein flow control is applied to the first node of the nodes independent of whether flow control is applied to another node of the nodes.

Example 11 includes one or more examples, wherein the retaining relative priority of a packet departure time for the first node with respect to a second packet departure time associated with a second node of the nodes during a duration of flow control comprises adjusting the packet departure time and the second packet departure time to stay within a time window but not rollover.

Example 12 includes one or more examples, wherein the retaining relative priority of a packet departure time for the first node with respect to a second packet departure time associated with a second node of the nodes during a duration of flow control comprises retaining a relative time order between the packet departure time and the second packet departure time.

Example 13 includes one or more examples, wherein sorting packet departure times of the nodes from lowest to highest, the packet departure times of the nodes comprising the adjusted packet departure time and the adjusted second packet departure time.

Example 14 includes one or more examples, wherein the sorting packet departure times of the nodes from lowest to highest comprises sorting the packet departure times within a transmit scheduling window.

Example 15 includes one or more examples, wherein the network interface device is to: based on flow control applied at a port level, retain the packet departure time and the second packet departure time for submission after flow control at the port level ends.

Example 16 includes one or more examples, and includes an apparatus comprising: a network interface device comprising a packet transmission scheduler, wherein the packet transmission scheduler is to: perform packet transmit arbitration among nodes, wherein based on a first node of the nodes having transmission paused by flow control, the perform packet transmit arbitration among nodes comprises retain relative priority of a packet departure time for the first node with respect to a second packet departure time associated with a second node of the nodes during a duration of flow control.

Example 17 includes one or more examples, wherein the retain relative priority of a packet departure time for the first node with respect to a second packet departure time associated with a second node of the nodes during a duration of flow control comprises adjust the packet departure time and the second packet departure time to stay within a time window but not rollover.

Example 18 includes one or more examples, wherein the retain relative priority of a packet departure time for the first node with respect to a second packet departure time associated with a second node of the nodes during a duration of flow control comprises retain a relative time order between the packet departure time and the second packet departure time.

Example 19 includes one or more examples, wherein the packet transmission scheduler is to: sort packet departure times of the nodes from lowest to highest, the packet departure times of the nodes comprising the adjusted packet departure time and the adjusted second packet departure time.

Example 20 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

What is claimed is:

1. A method comprising:
   in a network interface device that comprises a host interface, direct memory access (DMA) circuitry, and a network interface:
   performing packet transmit arbitration among nodes for a port comprising:
      based on a first node of the nodes having transmission paused by flow control, the performing packet transmit arbitration among nodes comprises retaining priority of a packet departure time for the first node with respect to a second priority of a second packet departure time associated with a second node of the nodes during a duration of the flow control and
      based on ending of the flow control, retaining the packet departure time and the second packet departure time for submission to the packet transmit arbitration, wherein:
         the transmission paused by flow control comprises a pause of packet transmission,
         the first node is associated with a first traffic class, and
         the second node is associated with a second traffic class.

2. The method of claim 1, wherein the flow control is applied to the first node of the nodes independent of whether flow control is applied to another node of the nodes.

3. The method of claim 1, wherein the retaining priority of the packet departure time for the first node with respect to the second packet departure time associated with a second node of the nodes during a duration of flow control comprises adjusting the packet departure time and the second packet departure time to stay within a time window but not rollover.

4. The method of claim 1, wherein the retaining priority of the packet departure time for the first node with respect to the second packet departure time associated with a second node of the nodes during a duration of flow control comprises retaining a time order between the packet departure time and the second packet departure time.

5. The method of claim 3, comprising sorting packet departure times of the nodes from lowest to highest, the packet departure times of the nodes comprising the adjusted packet departure time and the adjusted second packet departure time.

6. The method of claim 5, wherein the sorting packet departure times of the nodes from lowest to highest comprises sorting the packet departure times within a transmit scheduling window.

7. The method of claim 1, wherein a network interface device is to perform the performing packet transmit arbitration among nodes and wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

8. At least one non-transitory computer-readable medium comprising instructions stored thereon, that if executed by one or more processors, cause the one or more processors to:
   configure a network interface device to perform packet transmit arbitration among nodes for a port, wherein based on a first node of the nodes having transmission paused by a received request to perform flow control:
      the performing packet transmit arbitration among nodes comprises retaining priority of a packet departure time for the first node with respect to a second packet departure time associated with a second node of the nodes during the flow control and
      based on ending of the flow control, retaining the packet departure time and the second packet departure time for the packet transmit arbitration.

9. The least one computer-readable medium of claim 8, wherein the flow control is applied to the first node of the nodes independent of whether flow control is applied to another node of the nodes.

10. The least one computer-readable medium of claim 8, wherein the retaining priority of the packet departure time for the first node with respect to the second packet departure time associated with a second node of the nodes during a duration of flow control comprises adjusting the packet departure time and the second packet departure time to stay within a time window but not rollover.

11. The least one computer-readable medium of claim 8, wherein the retaining priority of the packet departure time for the first node with respect to the second packet departure time associated with a second node of the nodes during a duration of flow control comprises retaining a time order between the packet departure time and the second packet departure time.

12. The least one computer-readable medium of claim 10, wherein sorting packet departure times of the nodes from lowest to highest, the packet departure times of the nodes comprising the adjusted packet departure time and the adjusted second packet departure time.

13. The least one computer-readable medium of claim 12, wherein the sorting packet departure times of the nodes from lowest to highest comprises sorting the packet departure times within a transmit scheduling window.

14. An apparatus comprising:
a network interface device comprising a host interface, a direct memory access (DMA) circuitry, a network interface, and packet transmission scheduler, wherein the packet transmission scheduler is to:
perform packet transmit arbitration among nodes for a port, wherein based on a first node of the nodes having transmission paused by flow control, the perform packet transmit arbitration among nodes comprises retain priority of a packet departure time for the first node with respect to a second packet departure time associated with a second node of the nodes during a duration of the flow control and
after ending of the flow control, retaining the packet departure time and the second packet departure time for the packet transmit arbitration.

15. The apparatus of claim 14, wherein the retain priority of the packet departure time for the first node with respect to the second packet departure time associated with the second node of the nodes during the duration of flow control comprises adjust the packet departure time and the second packet departure time to stay within a time window but not rollover.

16. The apparatus of claim 14, wherein the retain priority of the packet departure time for the first node with respect to the second packet departure time associated with the second node of the nodes during the duration of flow control comprises retain a relative time order between the packet departure time and the second packet departure time.

17. The apparatus of claim 15, wherein the packet transmission scheduler is to:
sort packet departure times of the nodes from lowest to highest, the packet departure times of the nodes comprising the adjusted packet departure time and the adjusted second packet departure time.

18. The apparatus of claim 14, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

* * * * *